Aug. 26, 1958 D. H. GRIDLEY 2,849,622

CONTROL CIRCUITS

Filed July 19, 1946

Inventor
DARRIN H. GRIDLEY

By M. O. Hayes
Attorney

United States Patent Office 2,849,622
Patented Aug. 26, 1958

2,849,622

CONTROL CIRCUITS

Darrin H. Gridley, Washington, D. C.

Application July 19, 1946, Serial No. 684,905

2 Claims. (Cl. 250—205)

(Granted under Title 35, U. S. Code (1952), sec. 266)

This invention relates in general to control circuits and more particularly to electronic switching circuits.

In many industrial applications it is frequently desirable to control the performance of, or to initiate and terminate the operations of certain equipment from a remote point. In such instances the control circuits are generally located adjacent the apparatus to be controlled while the apparatus for actuating the control circuits are located at the remote point. In such installations it is economically desirable that the control circuits consume a minimum of standby power and that their action be fast and positive. Additionally, it is generally preferred that the signal for actuating the control circuits be in the form of a momentary impulse rather than a continuous wave, since the latter would ordinarily require additional apparatus to generate the same.

Accordingly it is an object of this invention to provide an electronic control circuit having minimum standby power requirements.

It is another object of the invention to provide an electronic control circuit operative in response to a momentary impulse control signal.

It is another object of the invention to provide a control circuit which may be energized by means of a momentary impulse of one polarity and deenergized by a momentary impulse of the opposite polarity.

It is another object of the invention to provide a control circuit which may be energized by the coincidence of two momentary impulses of one polarity and deenergized by a single momentary impulse of the opposite polarity.

Other objects and advantages will be apparent from the following detailed description taken in conjunction with the following drawings wherein.

Briefly this invention comprises a suitable grid controlled vacuum tube circuit and a relay means associated therewith. The vacuum tube circuit is, in its quiescent state, biased to draw zero current whereby the standby power requirements of the circuit are minimized. In response, however, to a momentary input pulse of one polarity, the vacuum tube circuit is rendered conducting and the resulting current flow therethrough acts to energize the relay means. Energization of the relay means places in the circuit an additional biasing voltage which overcomes the quiescent bias to thereby hold the circuit conducting, and hence maintain the relay means energized. Conversely a momentary impulse of the opposite polarity operates to disrupt the current flow through the circuit and deenergize the relay means to thereby return the circuit to its quiescent state.

As will be hereinafter fully understood the term "relay means" includes among other devices a light operated photocell. In fact in certain instances this type of relay is preferred, since it will offer certain advantages not found in a mechanical relay system.

Figures 1, 2:
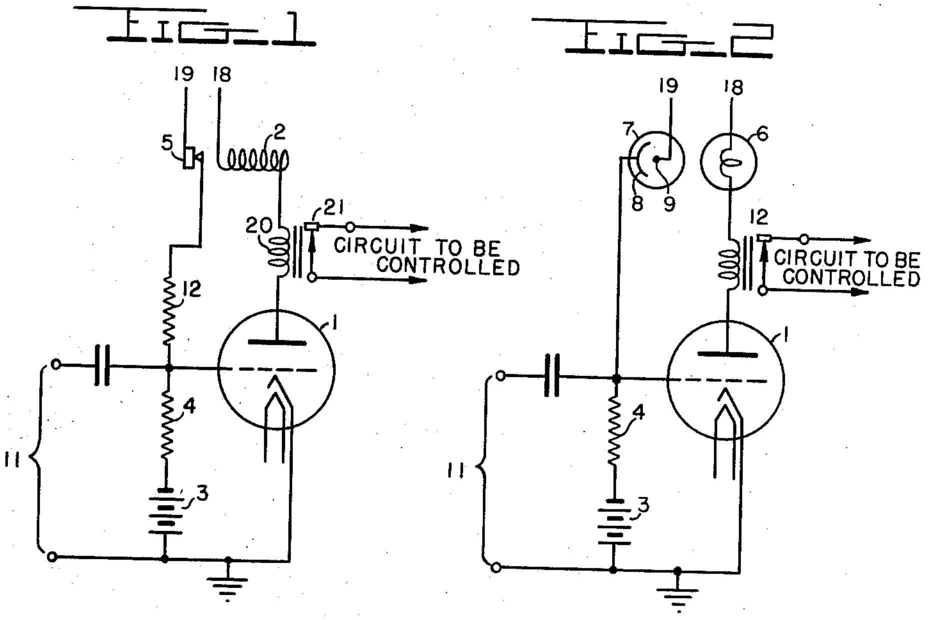
Fig. 1 is a schematic diagram of an embodiment of the invention utilizing mechanical relay means.
Fig. 2 is a schematic diagram of an embodiment of the invention utilizing incandescent photo electric relay means.

Referring to Fig. 1 there is shown one embodiment of the invention comprising a vacuum tube triode 1, having a relay coil 2, in its anode circuit, and a direct current bias source 3, and resistor 4 connected in series between its cathode and grid. Said grid is also connected, when relay contacts 5 are closed, to a positive source of voltage 19. The tube 1 is normally biased, by source 3, just beyond cutoff and therefore is normally nonconducting. If a positive electrical pulse is applied to the grid of the tube via the input terminals 11, the tube 1, will start to conduct, coil 2 will be energized and contacts 5 will be closed causing a current to flow through contacts 5, resistors 4 and 12, and the direct current voltage source 3, to ground. The grid bias developed across resistor 4 will thereafter keep tube 1 conducting and the relay energized. If desired, a second set of contacts 21, for controlling the operation of an auxiliary circuit may be associated with a second coil 20 and operated thereby.

The tube 1 will conduct until a negative pulse larger than the voltage across resistor 4 is fed to the input terminals 11 at which time the tube 1 will be cut off, coil 2 deenergized and contacts 5 opened. Tube 1 will then remain cutoff, until another positive pulse is applied to the input terminals 11.

In the embodiment illustrated in Fig. 2, to which reference is now made, the mechanical relay is replaced by a photo electric relay. In this circuit a photo tube 7 having a cathode 8 and an anode 9, is substituted for the contacts 5 and an incandescent lamp 6 is inserted in the plate circuit of triode 1, in place of the relay coil 2. Again in the quiescent state of the circuit, biasing voltage 3 holds tube 1 normally nonconducting, in which state lamp 6 is extinguished.

When a positive pulse is applied at the input terminals 11 tube 1 will conduct, energizing lamp 6. The light from lamp 6 will cause electrons to flow from the photo emissive cathode 8 to the anode 9 completing the circuit from source 19 to ground, through bias source 3, resistor 4, and the photo tube 7.

The voltage developed across the resistor 4 will keep tube 1 conducting and therefore lamp 6 lit, until a negative pulse greater than the voltage across resistor 4 is fed to the input terminals 11, at which time tube 1 will be cut off and the current through photo tube 7 will be broken. This arrangement contains no moving parts and therefore, it is capable of much faster operation than the circuit of Fig. 1. Again, a pair of contacts operable in response to relay winding 20 inserted in the plate circuit of tube 1 may be used to control the operation of an auxiliary circuit.

Figure 3:
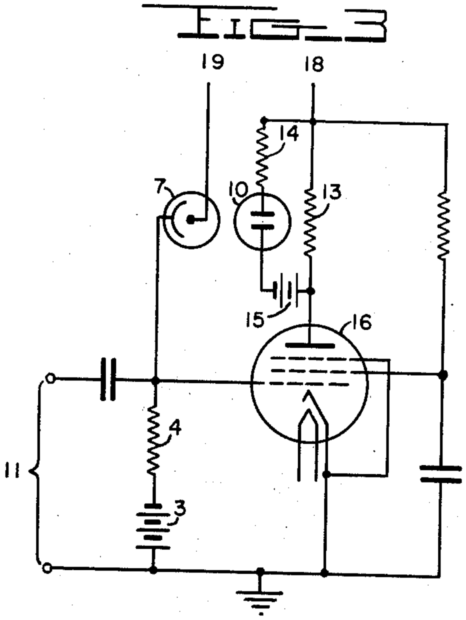
Fig. 3 is a schematic diagram of an embodiment of the invention utilizing gas tube photo electric relay means.

In Fig. 3 the incandescent lamp of Fig. 2 is replaced by a gas glow tube 10, such as a neon or argon tube which conducts current and emits a characteristic color light when a suitable voltage is impressed across it. In this illustration the vacuum tube 16, is represented as being of the pentode variety. Resistor 14 is a current limiting resistor in series with the gas glow tube 10. Voltage source 15 is provided in series with the gas glow tube 10, to reduce the amount of voltage required to cause the gas glow tube to conduct, and thus provide faster operation.

Figure 4:
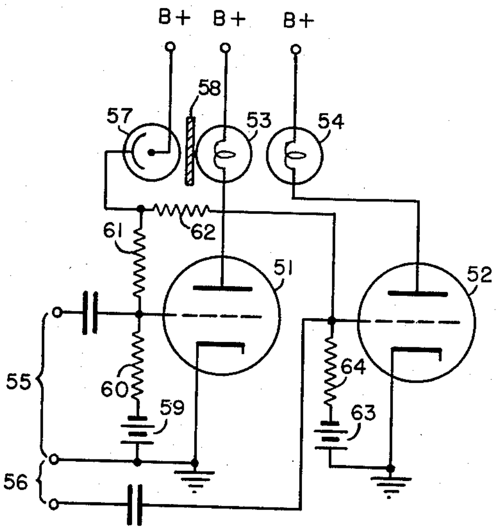
Fig. 4 is a schematic diagram of an embodiment of the invention operative in response to the coincidence of two momentary impulses.

In Fig. 4 a circuit useful for controlling the operation of one or two auxiliary circuits in response to the coincidence between a pair of momentary impulses, is shown.

In this illustration the circuit comprises two vacuum tubes 51 and 52 each having a light source 53 and 54 in their anode circuits. The grid of each tube is connected to one of two separate input terminals 55 and 56, and they are also connected together through isolating resistors 61 and 62. The photo tube 57 comprises an anode connected to a source of positive voltage and a photo emissive cathode connected to each grid through isolating resistors. The photo tube 57 is mounted adjacent to and is responsive to the total light of the two light sources 53 and 54, through the light filter 58. The relay components comprising lamps 53 and 54 and photo cell 57 may be mounted in the same envelope if desired.

As before, both tubes are normally biased beyond cutoff by the bias sources 59 and 63. The light filter 58 is chosen so that the photo tube 57 is only responsive to the total light from both light sources. Therefore, the photo tube 57 will not complete the circuit through it unless both light sources are lit in coincidence. When momentary impulses of the same polarity are fed to both input terminals 55 and 56 simultaneously, both tubes 51 and 52 will be energized and both light sources 53 and 54 will be lit and photo tube 57 will complete the circuit through itself to ground, developing a positive voltage across resistors 60 and 64, which will hold both tubes 51 and 52 in operating condition until a single momentary impulse of the opposite polarity and greater than the voltage developed across resistors 60 or 64 is applied to either of the input terminals 55 or 56.

It is noted that the initiating input pulses must coincide and that the circuit is not operative in response to a single input pulse on either input terminal.

From the foregoing discussion it is apparent that considerable modification of the features of the present invention is possible and while the devices herein described and the forms of apparatus for the operation thereof constitute a preferred embodiment of the invention it is to be understood that the invention is not limited to these precise devices and forms of apparatus and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. In a bistable circuit, a variable impedance device having a conductive state and a nonconductive state and including at least a first element, a second element and a control element, means connected to said variable impedance device for maintaining the same in said nonconductive state, a first source of potential, an impedance element, means for connecting said impedance element between said first element and said first source of potential, a gas discharge device, a second source of potential, means for connecting said gas discharge device and said second source of potential to form a series circuit connected in parallel with said impedance element such that the potential difference across the impedance element and the first source of potential are additive when said variable impedance device is in said conductive state, a photo tube positioned to receive radiant energy from said gas discharge device, means for maintaining said variable impedance device in the conductive state, means for connecting said photo tube between the last mentioned means and the control element of said variable impedance device, means connected to said variable impedance device for triggering the same to a selected one of the states, an output circuit, and means for connecting said output circuit to the variable impedance device.

2. In a bistable circuit, a variable impedance device having a conductive state and a nonconductive state and including at least a first element, a second element and a control element, means connected to said variable impedance device for maintaining the same in said nonconductive state, a first source of potential, an impedance element, means for connecting said impedance element between said first element and said first source of potential, a gas discharge device, a second source of potential having a magnitude less than the striking potential of said gas discharge device, means for connecting said gas discharge device and said second source of potential to form a series circuit connected in parallel with said impedance element such that the potential difference across the impedance element and the first source of potential are additive when said variable impedance device is in said conductive state, a photo tube positioned to receive radiant energy from said gas discharge device, means for maintaining said variable impedance device in the conductive state, means for connecting said photo tube between the last mentioned means and the control element of said variable impedance device, means connected to said variable impedance device for triggering the same to a selected one of the states, an output circuit, and means for connecting said output circuit to the variable impedance device.

References Cited in the file of this patent

UNITED STATES PATENTS

| | | |
|---|---|---|
| 1,580,088 | Sanders | Apr. 6, 1926 |
| 1,669,153 | Alexanderson et al. | May 8, 1928 |
| 1,867,139 | Bellescize | July 12, 1932 |
| 2,043,671 | McMaster | June 9, 1936 |
| 2,056,912 | Swart | Oct. 6, 1936 |
| 2,088,466 | Diamond | July 27, 1937 |
| 2,162,508 | Knowles | June 13, 1939 |
| 2,185,192 | Hansell | Jan. 2, 1940 |
| 2,193,789 | Braselton | Mar. 19, 1940 |
| 2,282,182 | Gulliksen | May 5, 1942 |
| 2,404,696 | Deal | July 23, 1946 |
| 2,441,006 | Canfora | May 4, 1948 |